US006939487B1

(12) United States Patent
Ajello et al.

(10) Patent No.: US 6,939,487 B1
(45) Date of Patent: Sep. 6, 2005

(54) DEBLOCKING CONTACT LENSES

(75) Inventors: Ellen Marie Ajello, Decatur, GA (US); Michael Nelson Wilde, Kennesaw, GA (US); Yasuo Matsuzawa, Roswell, GA (US)

(73) Assignee: Novartis A.G., Basel (CH)

( * ) Notice: Subject to any disclaimer, the term of this patent is extended or adjusted under 35 U.S.C. 154(b) by 315 days.

(21) Appl. No.: 09/687,278

(22) Filed: Oct. 13, 2000

Related U.S. Application Data

(60) Provisional application No. 60/325,779, filed on Oct. 13, 2000.

(51) Int. Cl.[7] ................................................ B29D 11/00

(52) U.S. Cl. ........................... 264/2.6; 264/28; 264/334

(58) Field of Search .......................... 264/1.1, 2.6, 334, 264/28, 85; 425/808, 444, 445

(56) References Cited

U.S. PATENT DOCUMENTS 4,985,186 A * 1/1991 Nose et al.
5,259,998 A 11/1993 Reich et al. ................. 264/1.1
5,607,518 A * 3/1997 Hoffman et al.
5,698,047 A 12/1997 Keene et al. ............ 134/22.18

FOREIGN PATENT DOCUMENTS

| | | | |
|---|---|---|---|
| EP | 1 029 654 | | 8/2000 |
| EP | 0 806 286 | | 8/2002 |
| JP | 1-152015 | * | 6/1989 |
| WO | WO 95/20476 | | 8/1995 |
| WO | WO 97/13635 | | 4/1997 |
| WO | WO 98/07554 | | 2/1998 |

OTHER PUBLICATIONS

European Search Report.

* cited by examiner

*Primary Examiner*—Mathieu D. Vargot
(74) *Attorney, Agent, or Firm*—Rob J. Gorman; Jian S. Zhou; R. Scott Meece

(57) ABSTRACT

A method and apparatus for removing a polymeric contact lens from a mold comprising lowering the temperature of the contact lens with a cryogenic material, such as liquid nitrogen, to a temperature and for a time sufficient for the lens to release from the mold without the application of external forces.

24 Claims, 2 Drawing Sheets

DEBLOCKING CONTACT LENSES

This application claims priority to provisional application Ser. No. 60/325,779, filed Oct. 13, 2000, which was converted to a provisional application by petition from non-provisional application Ser. No. 09/428,067, filed Oct. 27, 1999.

FIELD OF THE INVENTION

The invention relates to a method for use in manufacturing ophthalmic components, such as a contact lens. Specifically, the invention relates to a method and apparatus for removing a contact lens from a mold, a process also known as "deblocking" a contact lens.

BACKGROUND OF THE INVENTION

The most common materials currently utilized in manufacturing soft contact lens are polymers and copolymers of 2-hydroxyethyl methacrylate (HEMA). These hydrophilic polymers move well on the eye and provide sufficient oxygen permeability for daily wear. Some HEMA soft contact lenses have been approved for extended periods of wear up to 7 days. However, such extended wear may result in comeal swelling and development of surface blood vessels in the sclera.

Research for improved oxygen permeable polymers has led to the development of polymers containing silicone groups. A variety of siloxane-containing polymers exhibit high oxygen permeability. Because of their oxygen permeability siloxane-containing polymers show great promise as the next generation of contact lens polymer. Unfortunately, siloxane-containing polymers possess physical characteristics that have thus far hindered their ascension to dominance in the field of contact lenses.

In layman's terms, siloxane-containing polymers are sticky. Contact lenses made of these polymers are hydrophobic and tend to adhere to various surfaces, severely complicating the manufacturing process. For example, a siloxane-containing lens will adhere to surfaces during the transfer of the lens from point to point during the manufacturing process. One particular point in the manufacturing process that often causes problems is removing the lens from the mold, a step that is also known as "deblocking" the lens.

Those familiar with the art know that a contact lens mold typically consists of a base curve (convex) mold half and a front curve (concave) mold half formed from a polymer. In the siloxane-containing lens manufacturing context, polyolefin (e.g., polypropylene) molds are most commonly used. The front curve and base curve mold halves are fitted together to form a small crescent shaped mold cavity between the base curve mold half and the front curve mold half. Introducing a fluid monomer to the front curve mold and then sandwiching the monomer with the base curve mold forms a fluid monomer in the shape of a lens. The choice of monomer and the shape of the crescent shaped cavity determine the optical properties of the lens. The monomer is then polymerized through heat treatment, light treatment or other polymerizing process, thus forming a soft contact lens.

After the lens is formed the mold halves are separated. Contact lenses, especially siloxane-containing lenses, regularly stick to one of the mold halves. In the siloxane-containing lens context, the lenses tend to attach to the front curve mold half. Those skilled in the art typically refer to a front curve or back curve mold half as a "mold." For the rest of this discussion the terms mold half and mold will be used interchangeably unless the context requires otherwise. Those skilled in the art will readily recognize such context.

The reason for the particular attachment to the front curve mold is not completely understood. The adherence of the lens is probably related to a combination of the lens mold interface phenomena and physical properties of the lens including the mold surface morphology, internal stress build up within the lens (or distortion) and the stress distribution and the wettability of the lens material.

Under dry conditions it is difficult to separate a siloxane-containing lens from a mold surface due to adhesion between the lens and mold surface. Lenses can be forced to separate from the mold surface by applying a force, such as with a pair of tweezers. Nevertheless, the application of such force to peel a lens off of a mold surface often results in damage to the lens. For example, the lens may become scratched, distorted or torn, each of which renders it useless.

The adhesion between the lens and mold surface can be weakened when the molecules of the lens polymer become mobile. For example, the molecules may become mobile by adding heat or chemicals such as a solvent. Accordingly, an alternative method for removing a lens from a mold surface involves the use of a solvent such as isopropyl alcohol ("IPA"). In this method IPA is applied directly to the lens as it adheres to the mold surface. The solvent swells the lens and helps reduce the forces holding the lens to the mold surface. The lens may then be removed from the mold surface.

Although this method of deblocking reduces the likelihood of damage to the lens, the collection and disposal of used solvent carries both an economic and environmental price. For example, used IPA may be classified as hazardous waste in some states. Accordingly, a need exists for an improved method for removing a contact lens from a mold.

OBJECT AND SUMMARY OF THE INVENTION

An object of the invention is to provide a non-mechanical method of deblocking a contact lens.

A further object of the invention is to provide a method of deblocking a contact lens that does not require a solvent.

A further object of the invention is to provide a method of deblocking a contact lens that does not damage the contact lens.

A further object of the invention is to provide a method of deblocking a contact lens that does not generate a potentially hazardous waste as a by-product A further object of the invention is to provide a method of deblocking a contact lens using a cryogenic material.

An object of the invention is to provide an apparatus for use in deblocking a contact lens.

A further object of the invention is to provide an apparatus for use in deblocking a contact lens that may be used in a cryogenic deblocking process.

A further object of the invention is to provide an apparatus for use in deblocking a contact lens that does not damage the contact lens.

A further object of the invention is to provide an apparatus for use in deblocking a contact lens that allows substantial automation of a cryogenic deblocking process.

A further object of the invention is to provide a carrier that can receive a contact lens mold bearing a contact lens and transport said mold and lens through a deblocking sequence in an efficient manner.

The invention meets these objects with a method for extracting a contact lens from a mold by lowering the temperature of the contact lens to a temperature sufficient to lessen adherence between the lens and the mold then removing the lens from the mold. The lowering of the temperature of the contact lens is accomplished by direct or indirect contact with a cryogenic substance, such as liquid nitrogen.

The invention also meets these objects with an apparatus to deblock and collect contact lenses comprising a top plate for receiving a contact lens mold bearing a contact lens and a bottom plate for receiving the contact lens. The contact lens mold is oriented within the top plate such that the contact lens is free to fall to the bottom plate after deblocking through application of a cryogenic material. The following sections set forth a preferred embodiment of the invention in which:

DESCRIPTION OF THE PREFERRED EMBODIMENTS

Figure 1:
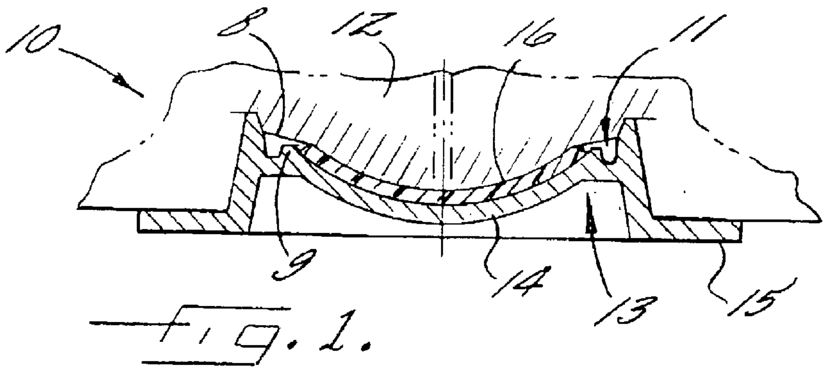
FIG. 1 is a cross-sectional view of a contact lens mold.

The present invention is based upon the surprising discovery that reducing the temperature of a contact lens may weaken the forces causing adherence of the contact lens, and specifically a siloxane-containing lens, to the surface of a mold.

The present invention is a method for extracting a polymeric contact lens from a mold. In its broadest aspects, the method comprises lowering the temperature of the contact lens to a temperature sufficient to reduce adhesion between the lens and the mold to a point where removing the lens will not damage the lens, and thereafter removing the lens from the mold.

Although the inventors do not wish to be bound by any particular theory, it appears that the step of lowering the temperature of the contact lens substantially reduces the molecular mobility of the contact lens polymer. Depending upon the circumstances, the step of lowering the temperature of the contact lens can comprise directly contacting the contact lens with the cryogenic substance, or contacting the mold with a cryogenic substance while the lens is in contact with the mold.

In particular, the cryogenic substance can be anything which, when placed in contact with either the mold or the lens, will reduce the temperature to the desired degree. The cryogenic substance is preferably selected from the group consisting of liquid nitrogen, liquid helium, liquid carbon dioxide, and solid carbon dioxide ("dry ice"), with liquid nitrogen being most presently preferred as having the optimum combination of ease of use and economic availability.

As noted above, the method is particularly useful when the contact lens material is a siloxane-containing polymer, more particularly a siloxane-containing hydrogel polymer.

In another aspect, the method comprises bringing the contact lens into contact with a cryogenic substance for a time sufficient to lower the temperature of the lens to a temperature sufficient to reduce adhesion between the lens and the mold to a point where removing the lens will not damage the lens. Thereafter, the method comprises separating the lens from the mold, and recovering the separated lens. Preferably, the step of separating the lens from the mold comprises lowering the temperature of the lens to a temperature at which the lens will release from the mold without the application of external force to the lens. As in the previous embodiment, the method can comprise either bringing the lens into contact with the cryogenic substance, or it can comprise bringing the mold with the lens therein or thereon into contact with the cryogenic substance, with the cooling of the mold being sufficient to cool the lens to the point at which it will release as desired from the mold.

In another aspect, the invention comprises a method for extracting a silicon containing polymeric contact lens from a mold comprising the steps of orienting a contact lens bearing mold upon a carrier with the contact lens in a position to fall from the mold under the influence of gravity. A contact lens collector is then positioned or situated in a position at which it can collect a contact lens that may fall from the oriented carrier. The mold carrying the lens is then brought into contact with the cryogenic substance which, as noted previously, causes the lens to release from the mold and separate therefrom. The method also comprises collecting the lens following its separation from mold.

In another aspect, the invention comprises a method for manufacturing silicon containing polymeric contact lenses. In this embodiment, the method comprises bringing two mold halves together to form a lens mold; filling the mold with an uncured polymer (those familiar with polymer chemistry will recognize that this can also be a pre-polymer or a low molecular weight polymer, or a polymer that can be further cross-linked); curing the polymer in the mold, usually by application of heat or ultraviolet light depending upon the particular chemistry of the lens polymer; separating the mold halves from one another; and bringing the mold half bearing the contact lens into contact with a cryogenic substance for a time sufficient to lower the temperature of the lens to a temperature sufficient to reduce adhesion between the lens and the mold half to a point at which removing the lens will not damage the lens. Thereafter the method comprises separating the lens from the mold half and recovering the separated lens.

When a siloxane-containing lens attached to a polypropylene mold is placed in a vessel containing a quantity of liquid nitrogen the lens separates itself from the mold and falls to the bottom of the vessel after a very short period of time and the polypropylene mold floats to the top of the liquid nitrogen.

Upon warming, the lens releases any liquid nitrogen adhering to its surface by giving off gaseous $N_2$. Any liquid nitrogen remaining in the container likewise evaporates. The end result is a clean deblocked contact lens without any troublesome waste byproducts, e.g. used IPA.

At this time, the physical mechanism of the cryogenic deblocking method is not completely understood. The fact that a lens will peel itself off of a mold surface suggests that there is some negative force or environment created by lowering the temperature of the contact lens which assists in reducing adhesion at the interface. For example, it is speculated that there may be a very small physical dimensional change in the lens and mold surface that causes the lens to release.

The operation of the preferred embodiment of the apparatus of the present invention comprises forming a contact lens in a mold, separating the mold and placing the mold half bearing the contact lens within a carrier with the mold being oriented contact lens side down. Situated underneath the mold and directly beneath the contact lens is a contact lens collector, a structure designed to receive the contact lens. Liquid nitrogen is then applied to the side of the mold opposite the contact lens in an amount sufficient to lower the temperature of the contact lens to the point where it would automatically release from the mold and fall to the contact lens collector. The thus deblocked contact lens then proceeds to subsequent steps in the manufacturing process.

The temperature sufficient to lower the temperature of the contact lens to the point where it would automatically release from the mold cannot be precisely defined as it will depend the cryogenic material used, as well as the materials used for the lenses and for the molds. One of skill in the art will recognize that determination of a sufficient temperature is easily obtained by only routine experimentation once the materials are known. Typically, the temperature achieved with liquid nitrogen is sufficient to deblock commercially available lens materials from a polypropylene mold. However, some mold materials may be incompatible with the present method. For instance, the method disclosed herein is may not be operable with molds made of certain grades of polycarbonate.

Referring now to FIG. 1, a cross-section of a typical soft contact lens mold 10 comprising a base curve mold half 12 and a front curve mold half 14 is shown. As can be seen from FIG. 1, the base curve mold half 12 and the front curve mold half 14 fit together to form a crescent shaped cavity. As discussed previously, placing a monomer in the crescent shaped cavity and polymerizing the monomer forms a contact lens 16. Typically, an excess of monomer is used to ensure a fully formed lens. Excess monomer results in a portion of the monomer being squeezed out of the mold. The excess monomer is separated from the contact lens 16 and retained within the overfill well 11 formed by the compression of the front curve critical lip 9 to the base curve seal 8.

After the contact lens 16 is formed the mold is separated into its two halves. Typically the contact lens adheres to the front curve mold.

In another aspect the invention is an apparatus for deblocking and collecting contact lenses formed of hydrophilic polymers that tend to adhere to mold surfaces. In this aspect the invention comprises a contact lens mold and means, illustrated in the drawings as the reservoir 13, for cooling the contact lens mold 14 and the lens 16 that is adhered to the mold 14. Although a front curve lens mold or a base curve lens mold may be utilized in the invention, for purposes of this discussion it will be assumed that the lens mold is a front curve lens mold 14. The means for cooling cools the mold 14 and the lens 16 to a temperature at which the lens 16 may be removed from the mold without damaging the lens may encompass any known method for cooling such as placing the contact lens and the mold to which it adheres within a sufficiently cooled enclosure. Such an approach, however, is cumbersome and inefficient and does not lend itself to integration in an automated manufacturing process.

Figure 2:
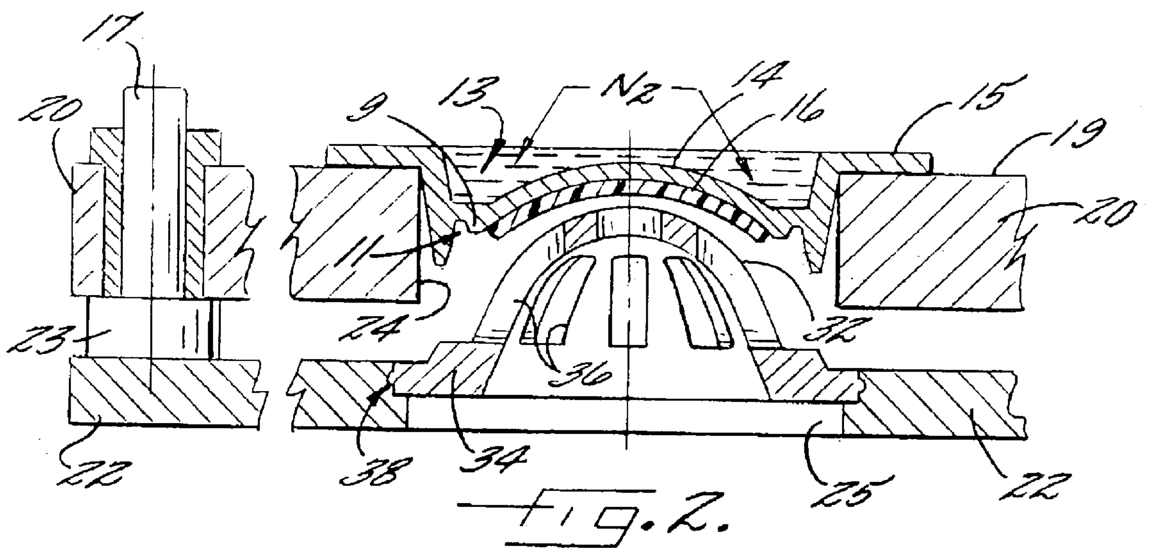
FIG. 2 is a perspective view of one embodiment of the deblocking apparatus according to the invention with a corner section removed.

A preferred embodiment of the invention is illustrated in FIG. 2 wherein the lens mold 14 is retained by a top plate 20. The top plate 20 is situated above the bottom plate 22. The bottom plate 22 is substantially parallel to the top plate 20 and retains a lens collector 26. The top plate 20 and the bottom plate 22 are aligned so that the lens mold 14 and the lens 16 are in axial alignment with the lens collector 26 retained by the bottom plate 22.

The side of the lens mold 14 opposite the lens 16 is formed to create a reservoir 13. A cryogenic material ("cryogent") is introduced to the reservoir 13 (preferably at its center) thereby cooling the mold 14 and the lens 16 to a temperature sufficient for the lens 16 to release from the mold 14 and fall to the lens collector 26. The cryogenic cooling of the mold also has the effect of shrinking the overfill well 11 thereby effectively trapping the excess monomer and removing it from the process. The cryogenic substance is preferably selected from the group consisting of liquid nitrogen, liquid helium, liquid carbon dioxide, and solid carbon dioxide ("dry ice"), with liquid nitrogen being most presently preferred as having the optimum combination of ease of use and economic availability.

Figure 3:
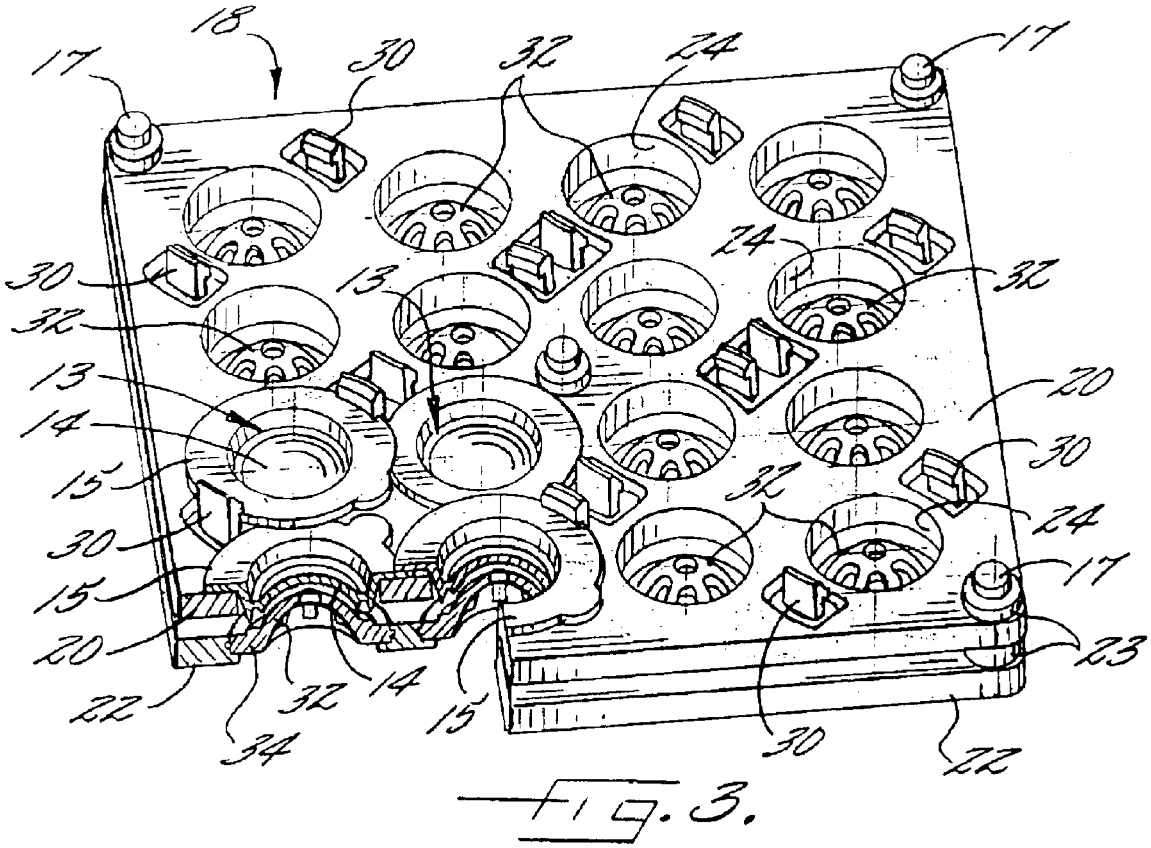
FIG. 3 is a cross-sectional view of the apparatus section removed from FIG. 2.

Referring now to FIG. 3, another embodiment of the invention is a contact lens carrier 18. The contact lens carrier according to the invention comprises two plates: a top plate 20 and a bottom plate 22.

The top plate 20 is defined by a top surface 19 and a bottom surface 21 separated by a predetermined width. The top plate 20 also possesses a plurality of holes 24, in this instance twelve, for receiving molds 14 bearing contact lenses 16. The contact lens mold received by the top plate 20 will be a front curve lens mold in most instances. Top plate 20 can also receive back curve lens molds with appropriate modifications. FIG. 3 shows a mold 14 oriented within the top plate hole 24 to place the contact lens 16 at a location intermediate the top plate top surface 19 and the top plate bottom surface 21. This orientation suspends the contact lens 28 above the bottom plate 22.

The top plate 20 also includes a retaining device to secure the positioning of the molds 14 during the deblocking process and during subsequent downstream manufacturing processes. Any suitable retaining device may be used to secure the positioning of the molds 14. For example, a retaining plate having holes corresponding to the top plate holes 24 may be placed above the molds. Likewise, the perimeter of the top plate holes 24 and the molds 14 may be molded or machined such that the molds 14 "snap-fit" into place.

Figure 4:
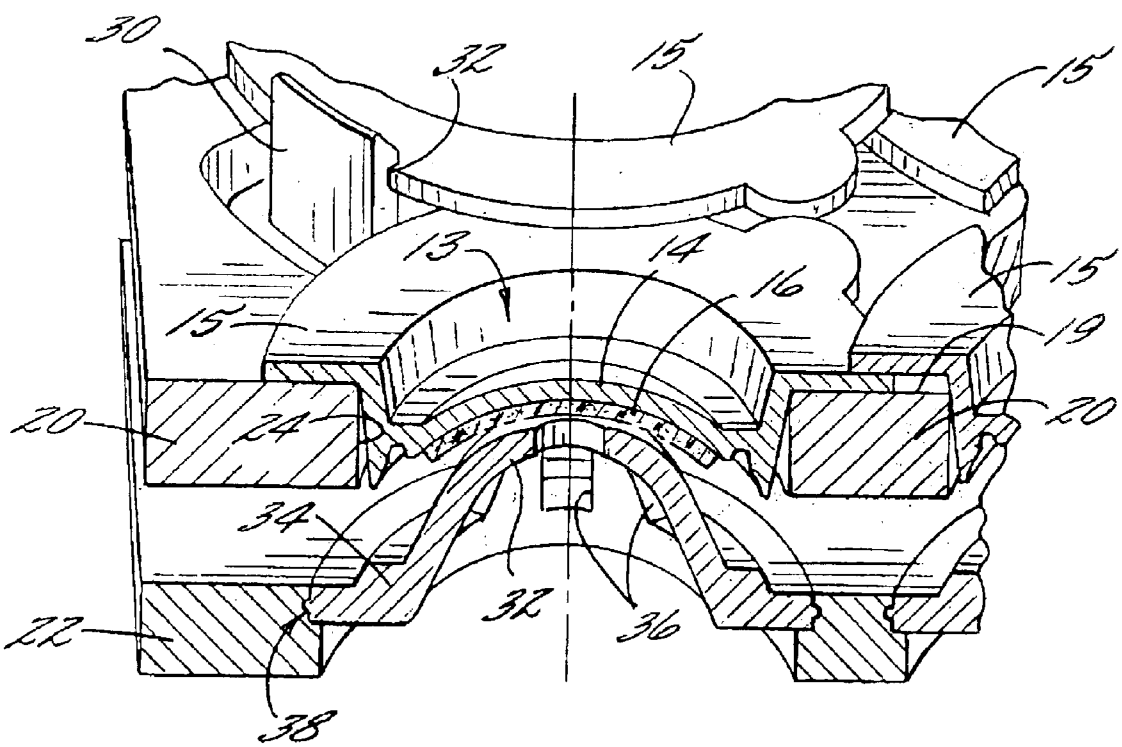
FIG. 4 is a perspective view of the apparatus section shown in FIG. 3.

FIG. 3 and FIG. 4 show a preferred embodiment of such a retaining device comprising a flexible tab 30 having a notch 32 that receives the outer flange 15 of the mold 14. A pair of flexible tabs 30 may retain each mold 14. Alternatively, the molds 14 may be oriented such that the outer flange 15 of one mold overlaps the outer flange 15 of another mold thereby reducing the number of flexible tabs 30 required to effectively secure the positioning of the molds. The molds 14 in FIG. 3 and FIG. 4 are secured by such an overlapping arrangement.

In some instances the contact lens may not separate itself from the mold. In these instances an application of a slight external force, such as tapping the mold, should suffice to dislodge the lens. The tapping force may be applied manually as with a small mallet. Alternatively, the tapping force may be automated. For example a small spring loaded piston may be placed in contact with the mold and automatically triggered thereby sending a small shockwave through the mold.

During deblocking, liquid nitrogen is applied to the side of the mold 14 opposite the contact lens 16 as shown in FIG. 3. The liquid nitrogen substantially reduces the temperature of the mold 14 and the contact lens 16. The contact lens 16 separates itself from the mold 14 and falls toward the bottom plate 22. The small quantity of liquid nitrogen applied to the mold 14 quickly evaporates leaving behind only a clean and deblocked lens mold.

In the preferred embodiment shown in FIG. 3, the top plate 20 and the bottom plate 22 are attached by a set of locking pins 17 that are received by both the top plate 20 and the bottom plate 22. Preferably a distance separates the top and bottom plates. In the preferred embodiment shown in FIG. 3, washer-like spacers 23 retained by the locking pins 17 separate the top plate 20 and the bottom plate 22. Alternatively, the spacers may be omitted and the top plate and the bottom plate may be in direct contact with each other. In this instance the thickness of the top and bottom plates may need to be increased to allow room for additional components that primarily reside between the two plates. These additional components are discussed below.

Although any type of three dimensional object may serve as a spacer between the top and bottom plates, the washer-like spacers 23 shown in FIG. 3 are preferred because they are easily removed and are adjustable when used in conjunction a set of locking pins 17. Likewise, any attaching mechanism such as nuts and bolts, screws, etc., may be used to secure the positioning of the top plate 20 with respect to the bottom plate 22, however, multiple locking pins, in conjunction with washer-like spacers, provide sufficient stability and desired adjustability.

Figure 5:
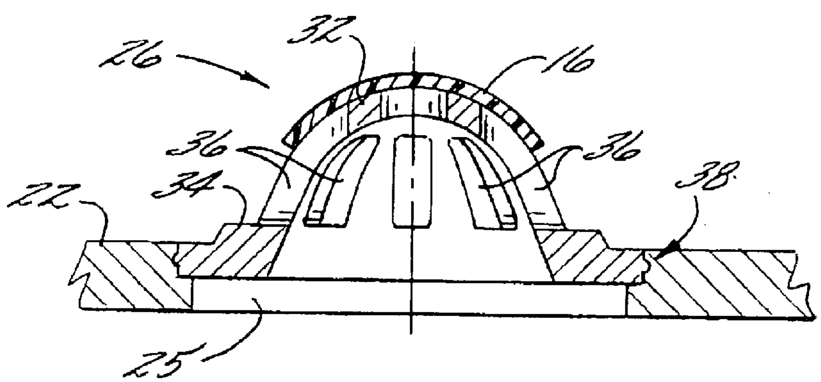
FIG. 5 is a cross-sectional view of a deblocked contact lens on a contact lens holder.

Referring now to FIG. 4 and FIG. 5, the bottom plate 22 is situated beneath the top plate 20. When the contact lens 16 is deblocked and falls toward the bottom plate 22 the deblocked lens 16 is received by a contact lens collector, generally indicated at 26. In a preferred embodiment shown in FIG. 5, the bottom plate 22 possesses a plurality of contact lens collectors 26 retained within a plurality of bottom plate holes 25. The contact lens collector 26 comprises a generally hemispherical structure 32 enclosed by an integrated flange 34. The contact lens collector 26 is preferably made from a polymer and is molded to "snap-fit" within bottom plate hole 25 as generally indicated by the "tongue and groove" junction 38 shown in FIG. 5. The generally hemispherical structure 32 is convex and extends upward from the flange 34 to a point intermediate the top plate surface 19 and the bottom plate.

It is to be understood that numerous other orientations are possible for the bottom plate and the contact lens collector. For example, the contact lens collector could comprise a table-like structure rather than a hemispherical structure. Likewise, the bottom plate and the contact lens collector could be a single integrated unit. Furthermore, the generally hemispherical structure 32, shown in a convex orientation in FIG. 5, could be concave to receive a contact lens from a base curve mold.

The generally hemispherical structure 32 shown in FIG. 5 preferably possesses several holes or perforations 36 for reducing the effective surface area of the hemispherical structure 32.

The top plate 20 and the bottom plate 22 are separated after deblocking is completed. The bottom plate 22 and the deblocked contact lens 16 proceed to subsequent points in the manufacturing process. After the initial observation that temperature reduction alone could deblock a contact lens, several more experiments were conducted to explore what effect, if any, this deblocking method had on a lens. These experiments proceeded as follows.

One hundred and fifty six (156) lenses with a Rx of−1.75 are manufactured according to Example B5 of U.S. Pat. No. 5,760,100 and staged within their molds and plastic bags for approximately 25 days prior to mold separation. Upon separation, the lenses and the front curve molds to which they adhered are separated into three groups each containing 52 lenses: A (Example 1), B (Example 2), and C (Example 3), for further testing. No lenses are damaged due to mold separation.

EXAMPLE 1

Prior Art

The Group A lenses are deblocked using IPA deblocking techniques known in the art. Each lens successfully separates from its mold surface by bathing the lens in IPA. All lenses exhibit good clarity, sphericity, and flex.

EXAMPLE 2

The Group B lenses are deblocked using direct contact with liquid nitrogen (i.e. liquid nitrogen was applied directly to the lens). Each lens separates from its mold surface, taking an average of 9.8 seconds. All lenses deblocked by this technique exhibit good clarity, sphericity, and flex. Furthermore, the deblocking technique does not result in detrimental changes in Rx measurements, mechanical properties (modulus, maximum stress, maximum elongation, and thickness), ion permeability, or XPS.

EXAMPLE 3

The Group C lenses are deblocked using indirect contact with liquid nitrogen (i.e. liquid nitrogen was applied to the side of the front curve mold opposite the contact lens). Forty-seven out of the fifty-two lenses separate from the mold surface, taking an average of 16.5 seconds. The failure of the five lenses to separate may have been partially due to excess lens material in the mold. All lenses deblocked by this technique exhibit good clarity, sphericity, and flex. Furthermore, the deblocking technique does not result in detrimental changes in Rx measurements, mechanical properties (modulus, maximum stress, maximum elongation, and thickness), ion permeability, or XPS.

As stated previously, the invention is preferably practiced using polypropylene molds. Because polypropylene is a known insulator, the difference in time between Group A (direct contact; 9.8 s) and Group B (indirect contact; 16.5 s) is most likely due to differences in the cooling efficiency of the two cooling methods, as well as location for freezing. One of skill in the art will recognize that the placement of contact of the cryogenic material with the mold will affect the cooling efficiency. Only routine experimentation is necessary to determine the optimum placement. Currently, it is preferred to place the cryogenic material immediately above the contact lens in the mold as explained above with reference to FIG. 2.

The invention has been described in detail, with reference to certain preferred embodiments, in order to enable the reader to practice the invention without undue experimentation. However, a person having ordinary skill in the art will readily recognize that many of the components and parameters may be varied or modified to a certain extent without departing from the scope and spirit of the invention. Furthermore, titles, headings, or the like are provided to enhance the reader's comprehension of this document, and should not be read as limiting the scope of the present invention. Accordingly, only the following claims and reasonable extensions and equivalents define the intellectual property rights to the invention.

What is claimed is:

1. A method for extracting a polymeric contact lens from a mold, the method comprising:

lowering the temperature of the contact lens with a cryogenic substance to a temperature sufficient to reduce adhesion between the lens and the mold to a point where removing the lens will not damage the lens, and thereafter removing the lens from the mold without the application of external force to the lens.

2. The method of claim 1 wherein the step of lowering the temperature of the contact lens comprises directly contacting the contact lens with the cryogenic substance.

3. The method of claim 2 wherein the cryogenic substance is selected from the group consisting of liquid nitrogen, liquid helium and solid carbon dioxide.

4. The method of claim 1 wherein the step of lowering the temperature of the contact lens comprises indirectly cooling the contact lens by contacting the mold with the cryogenic substance while the lens is in contact with the mold.

5. The method of claim 4 wherein the cryogenic substance is selected from the group consisting of liquid nitrogen, liquid helium and solid carbon dioxide.

6. The method of claim 1 wherein the contact lens comprises a siloxane-containing polymer.

7. A method for extracting a siloxane containing polymeric contact lens from a mold, the method comprising:

bringing the lens into contact with a cryogenic substance for a time sufficient to lower the temperature of the lens to a temperature sufficient to reduce adhesion between the lens and the mold to a point where removing the lens will not damage the lens, separating the lens from the mold without the application of external force to the lens, and recovering the lens.

8. A method according to claim 7 wherein the cryogenic substance is selected from the group consisting of liquid nitrogen, liquid helium and solid carbon dioxide.

9. A method according to claim 7 wherein the step of separating the lens from the mold comprises lowering the temperature of the lens to a temperature at which the lens will release from the mold without the application of external force to the lens.

10. A method for extracting a siloxane containing polymeric contact lens from a mold, the method comprising:

indirectly cooling the contact lens by bringing the mold into contact with a cryogenic substance for a time sufficient to lower the temperature of the lens to a temperature sufficient to reduce adhesion between the lens and the mold to a point where removing the lens will not damage the lens, separating the lens from the mold without the application of external force to the lens, and recovering the lens.

11. A method according to claim 10 wherein the cryogenic substance is selected from the group consisting of liquid nitrogen, liquid helium and solid carbon dioxide.

12. A method according to claim 10 wherein the step of separating the lens from the mold comprises lowering the temperature of the lens to a temperature at which the lens will release from the mold without the application of external force to the lens.

13. A method for extracting a siloxane containing polymeric contact lens from a mold, the method comprising:

orienting a contact lens bearing mold upon a carrier such that the contact lens may fall from the mold;

situating a contact lens collector so as to collect a contact lens which may separate from the mold and fall;

indirectly cooling the contact lens by causing the mold to come into intimate contact with a cryogenic substance;

causing separation of the lens from the mold without the application of external force to the lens; and collecting the lens.

14. A method according to claim 13 wherein the step of causing separation of the lens from the mold comprises causing the mold to come into intimate contact with a cryogenic substance for a time sufficient to lower the temperature of the lens to a temperature sufficient to reduce adhesion between the lens and the mold to a point where the lens will automatically separate from the mold and fall to the lens collector.

15. A method according to claim 14 wherein the cryogenic substance is selected from the group consisting of liquid nitrogen, liquid helium and solid carbon dioxide.

16. A method for manufacturing a siloxane containing polymeric contact lens from a mold, the method comprising:

bringing two mold halves together to form a lens mold;

filling the mold with an uncured polymer;

curing the polymer in the mold;

separating the mold halves from one another;

bringing the mold half bearing the contact lens into contact with a cryogenic substance for a time sufficient to lower the temperature of the lens to a temperature sufficient to reduce adhesion between the lens and the mold half to a point where removing the lens will not damage the lens;

separating the lens from the mold half without the application of external force to the lens; and recovering the lens.

17. A method according to claim 16 wherein the cryogenic substance is selected from the group consisting of liquid nitrogen, liquid helium and solid carbon dioxide.

18. A method according to claim 17 wherein the step of separating the lens from the mold half comprises bringing the mold half bearing the lens into contact with a cryogenic substance for a time sufficient to lower the temperature of the lens to a temperature sufficient to reduce adhesion between the lens and the mold half to a point where the lens will fall from the mold half when the mold half is oriented above the lens.

19. A method for extracting a polymeric contact lens from a mold, the method comprising:

lowering the temperature of the lens to a temperature at which the lens will release from the mold without the application of external force to the lens the temperature of the lens being lowered using a cryogenic substance.

20. The method of claim 19 wherein the step of lowering the temperature of the contact lens comprises directly contacting the contact lens with the cryogenic substance.

21. The method of claim 20 wherein the cryogenic substance is selected from the group consisting of liquid nitrogen, liquid helium and solid carbon dioxide.

22. The method of claim 19 wherein the step of lowering the temperature of the contact lens comprises indirectly cooling the contact lens by contacting the mold with the cryogenic substance while the lens is in contact with the mold.

23. The method of claim 22 wherein the cryogenic substance is selected from the group consisting of liquid nitrogen, liquid helium and solid carbon dioxide.

24. The method of claim 19 wherein the contact lens comprises a siloxane-containing polymer.

* * * * *